Figure 1:
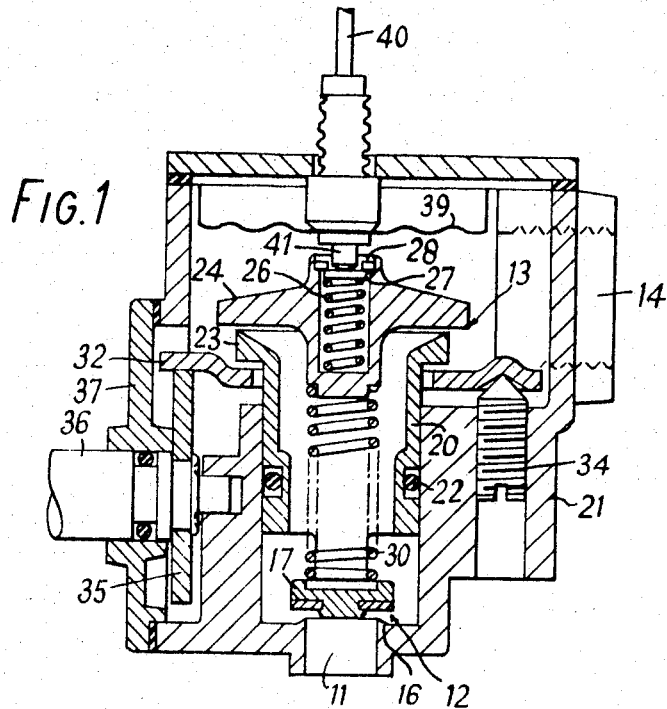

United States Patent
McGowan

[11] 3,729,131
[45] Apr. 24, 1973

[54] THERMOSTATICALLY CONTROLLED GAS VALVE

[75] Inventor: Eric McGowan, Shepperton, England

[73] Assignee: United Gas Industries Limited, London, England

[22] Filed: July 2, 1971

[21] Appl. No.: 159,248

[30] Foreign Application Priority Data

July 13, 1970 Great Britain.................33,843/70
Oct. 15, 1970 Great Britain.................49,031/70

[52] U.S. Cl.............236/99, 137/614.16, 236/15 A
[51] Int. Cl..............................................G05d 23/12
[58] Field of Search..................236/15 A, 99; 137/613, 614, 16

[56] References Cited

UNITED STATES PATENTS

| | | | |
|---|---|---|---|
| 1,617,886 | 2/1927 | Wild | 236/15 A |
| 3,129,884 | 4/1964 | Baatrup | 236/15 A X |
| 3,469,567 | 9/1969 | Bergquist | 236/15 A X |

Primary Examiner—William E. Wayner
Attorney—Larson, Taylor & Hinds

[57] ABSTRACT

A gas valve particularly for use in gas oven control systems comprises an isolating valve and a thermostatically controlled valve arranged in series. A common sleeve carries both the seat of the thermostatically controlled valve and the head of the isolating valve and a manual control moves the sleeve axially from an OFF position in which the isolating valve is closed to a selected position in which the thermostatically controlled valve is set to close when a temperature corresponding to said position is sensed in the oven.

8 Claims, 5 Drawing Figures

Patented April 24, 1973 3,729,131

2 Sheets-Sheet 2

THERMOSTATICALLY CONTROLLED GAS VALVE

This invention relates to gas valves, and to gas oven control systems including gas valves.

It is an object of the invention to combine a thermostatically controlled valve with a poppet type isolating valve, particularly, but not exclusively for use in a gas oven control system.

The invention provides a gas valve comprising a thermostatically controlled valve and an isolating valve each comprising a valve head member and a valve seat member, and a control device extending between the thermostatically controlled valve and the isolating valve and carrying or engaging one member of each valve whereby linear movements of the control device effect opening and closing motions of both valves.

Preferably said control device is a generally cylindrical sleeve, slidable axially in a valve body to be controlled by the temperature of the oven.

Figure 1A:
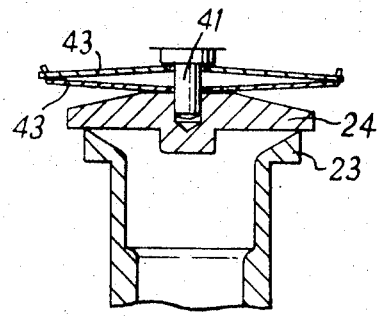
Figure 2:
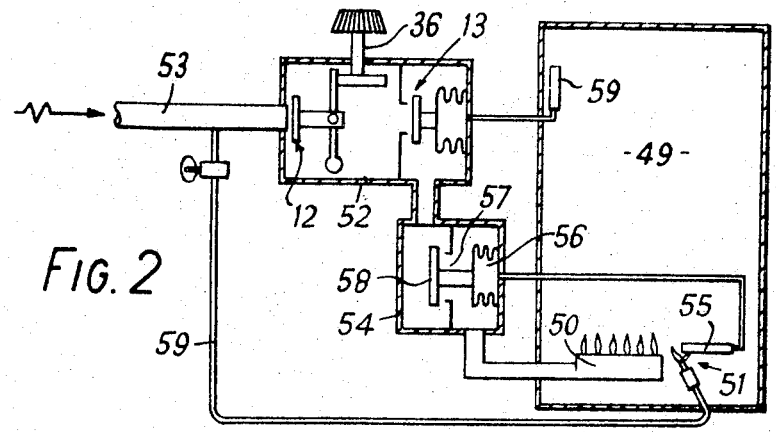
Figure 3:
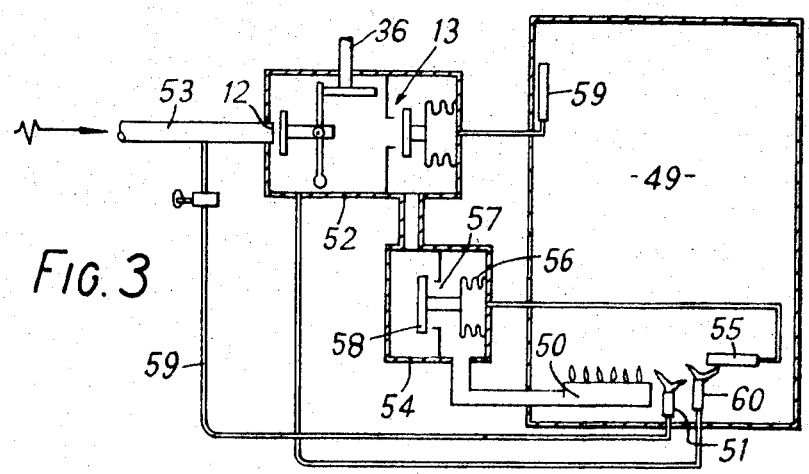
Figure 4:
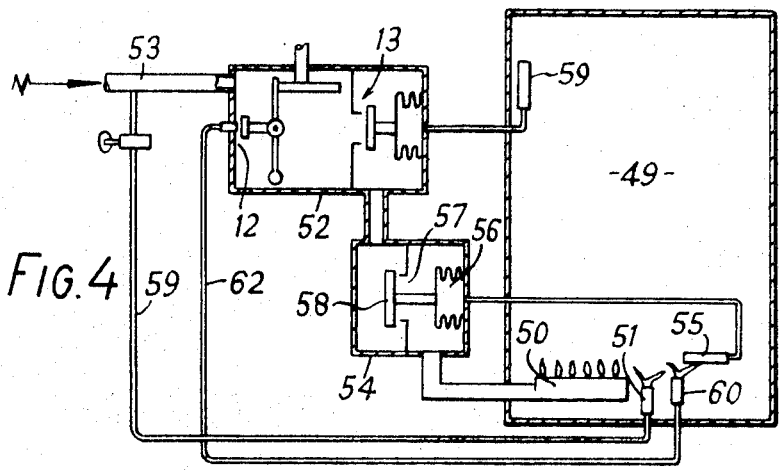

Embodiments of the invention are shown in the drawings accompanying the Provisional Specifications, in which:

FIG. 1 is a side section through one form of gas valve,

FIG. 1a. is a scrap section of a modification to the valve of FIG. 1,

FIG. 2 is a diagrammatic layout of a gas oven control system incorporating a gas valve, FIG. 3 is a diagrammatic layout of a second gas oven control system incorporating a gas valve, and FIG. 4 is a diagrammatic layout of a third gas oven control system incorporating a gas valve.

Referring first to FIG. 1, the valve shown has a gas inlet 11, and an isolating valve 12 and a thermostatically controlled valve 13 arranged in series in the gas flow to a gas outlet 14. The isolating valve 12 is of the poppet type and comprises a chamfered valve seat 16, and a co-operating valve head 17 provided with a sealing washer of resilient material to ensure a gas tight fit with the seat when the isolating valve is closed.

The valve head 17 is mounted at one end of a generally cylindrical control sleeve 20, slidable axially in sealing engagement with a valve body 21, in which said inlet 11 and outlet 14 are formed. The sleeve 20 is preferably arranged with its axis extending vertically, and has an O-ring seal 22 set into its exterior face. The other, upper, end of the sleeve is formed with an outwardly extending integral flange 23 which constitutes the seat of the thermostatically controlled valve 13. The head 24 of valve 13 is in the form of a disc having a hollow cylindrical center part closed at its lower end. Said center part accommodates an overload coil spring 26 which urges a small plate 27 at the top of the center part against an inwardly projecting flange 28.

A larger coil spring 30 is axially accommodated within the sleeve 20, abutting at one end the lower face of the valve head 24 and engaging the isolating valve head 17 at the other end.

The sleeve 20 is arranged to be moved axially relative to the body 21 by adjustment means which comprises a cam and lever mechanism. The lever 32 is apertured to allow the sleeve to extend therethrough and co-operates with the underside of flange 23 on the sleeve. One end of the lever is supported on an adjustable reaction screw 34, whilst the other end bears against a cam 35 which is rotatably adjustable by means of a control knob (not shown) mounted on shaft 36. Shaft 36 is sealed into a closure member 37 of the valve body 21.

Mounted above the thermostatically controlled valve 13 is a flexible diaphragm 39 forming one wall of a sealed capsule into which leads one end of a capillary tube 40. The other end of the tube 40 leads into a phial (not shown) filled with liquid of high coefficient of thermal expansion. The phial is positioned at a point the temperature of which is required to control the opening and closing of the valve 13.

Diaphragm 39 carries a plunger 41 which bears against the small plate 27, whereby expansion of the liquid in the phial is translated into downward movement of plate 27. This in turn causes downward, closing movement of the valve head 24 so closing off the supply of gas, when a pre-set temperature is reached. Similarly the valve is opened when the sensed temperature drops below said pre-set temperature.

In one extreme rotary position of the shaft 36, the isolating valve head 17 engages its seat to cut off completely the supply of gas. This is by means of the cam 35 which positions lever 32 so that sleeve 20 is allowed to be moved downward under the influence of spring 30. In other positions of the shaft 36, the cam and lever mechanism lifts the sleeve 20 to varying heights relative the thermostatically controlled valve head 24. In this way the temperature at which the thermostatically controlled valve shuts off can be varied. Fine adjustments to the position of the lever 32 may be made with the reaction screw 34 allowing calibration of the temperature range setting to be carried out in the factory.

The coil spring 30 ensures that the sleeve 20 remains in contact with the lever 32 and that the thermostatically controlled valve head 24 remains in contact with the plunger 41 of the diaphragm 39. Should a temperature overload occur for any given setting of the shaft 36, damage of the thermosensitive parts 40, 39, 41, is prevented by the fact that the plunger 41 can compress the spring 26 disposed within the thermostatically controlled valve head 24.

In the alternative temperature overload device shown in FIG. 1a, the coil spring 26 in the head is replaced by a double leaf spring 43 interposed between the head and a shoulder of the plunger 41.

The valve may have a releasable latched OFF position provided by an indent (not shown) in one of the rotary members (cam 35, shaft 36 on the control knob) co-operating with a latch tongue. This position relates to the extreme rotary position of shaft 36 in which the isolating valve 12 is maintained closed.

Referring now to FIG. 2, a gas-heated oven 49 has a main burner 50 adjacent a pilot burner 51 positioned to light the main burner. A gas valve 52, for instance as shown in FIG. 1 or FIG. 1 modified as shown in FIG. 1a, is connected in the main gas supply 53 to the main burner. A flame proving valve 54 is connected in series in the gas line between the gas valve 52 and the main burner 50. The flame proving valve comprises a temperature-sensing phial 55 positioned adjacent the pilot burner 51 to sense whether or not the pilot is alight. A bellows capsule 56 in the valve 54 is connected to the fluid in the phial 55 so that as the temperature rises the bellows expands. A valve head 58 is mounted on the bellows and arranged to co-operate with a seat 57, so that at higher temperatures the valve head 56 is lifted off its seat so allowing gas to reach the main burner. If the pilot is not alight however, the temperature sensed by phial 55 is too low to lift the head off the seat and no gas reaches the main burner.

The gas valve 52 has its temperature sensing phial 59 mounted within the oven, so that as described above, the temperature of the oven controls the opening and closing of the thermostatically controlled valve 13 thereof. Rotation of shaft 36 thereby adjusts the temperature of the oven, or in rotating to the extreme OFF position closes the isolating valve 12. The pilot burner 51 is supplied by a separate manually controlled line 59.

The embodiment shown in FIG. 3 is similar to that of FIG. 2 and has similar parts marked with the same reference numerals. In this arrangement, however, a further temporary pilot burner 60 is provided to heat the thermo-sensitive phial 55. This temporary pilot is supplied from a tapping in valve 52 intermediate the isolating valve 12 and the thermostatically controlled valve 13, so that it is closed off when valve 12 is closed but is not affected by valve 13. The positions of the two pilot burners 51, 60 and phial 55 are such that pilot 51 ignites the flames of both the main burner 50 and the temporary pilot 60, but does not heat the phial 55. Temporary pilot 60 is positioned to heat the phial 55 sufficiently to open the valve 54. Accordingly, when the isolating valve 12 is off, the temporary pilot 60 is also off and this causes the flame proving valve 54 to close.

The embodiment of FIG. 4 also has parts similar to those of FIG. 2 marked with the same reference numerals. In this arrangement the isolating valve 12 is connected to cut off not the main supply 53 as in the previous arrangements but the supply 62 to the temporary pilot burner 60. With this arrangement the flame-proving valve 54 acts to isolate the supply to the main burner 50. Manually turning off the isolating valve 12 in this arrangement turns off the temporary pilot burner 60, which in turn causes the flame-proving valve 54 to close.

I claim:

1. A gas valve comprising a valve body having a gas inlet and a gas outlet and carrying an isolating valve and a thermostatically controlled valve in series in a gas flow line between said inlet and said outlet, said isolating valve and said thermostatically controlled valve each comprising a valve head member and a valve seat member, a generally cylindrical sleeve slidable axially in said valve body and carrying or engaging one member of each valve whereby linear movements of the sleeve effect opening and closing motions of each valve, and means for moving said sleeve axially in said valve body, said means including a lever engaging said sleeve and a rotatable cam.

2. A gas valve as claimed in claim 1, including manually operable means for rotating said cam.

3. A gas valve as claimed in claim 2, wherein said cam has one rotary position in which said sleeve is at one extreme end of its linear movement in which the isolating valve is fully closed.

4. A gas valve as claimed in claim 3, wherein said cam has a plurality of other rotary positions in which said isolating valve is open and one member of the thermostatically controlled valve has a corresponding plurality of different positions relative to its other member.

5. A gas valve as claimed in claim 4, wherein said lever engages an abutment on said sleeve, and spring means engages the sleeve to urge said abutment against said lever whereby the control device follows movements of said lever.

6. A gas valve as claimed in claim 5, including a drive system for transmitting mechanical temperature representations to the valve head member of the thermostatically controlled valve, said drive system including a resilient member for allowing relative movement of said drive system and valve head member in thermal overload conditions.

7. A gas valve as claimed in claim 6, wherein said resilient member comprises a spring device.

8. A gas valve as claimed in claim 7, wherein linear movement of the sleeve in the sense to open said isolating valve causes closing movement of the thermostatically controlled valve.

* * * * *